(12) United States Patent
Hicks et al.

(10) Patent No.: US 10,400,320 B2
(45) Date of Patent: Sep. 3, 2019

(54) LEAD FREE STEEL AND METHOD OF MANUFACTURING

(71) Applicant: NUCOR CORPORATION, Charlotte, NC (US)

(72) Inventors: Matthew J. Hicks, Norfolk, NE (US); Jim L. Hill, Norfolk, NE (US); Brook C. Bugenhagen, Norfolk, NE (US)

(73) Assignee: NUCOR CORPORATION, Charlotte, NC (US)

( * ) Notice: Subject to any disclaimer, the term of this patent is extended or adjusted under 35 U.S.C. 154(b) by 312 days.

(21) Appl. No.: 15/153,455

(22) Filed: May 12, 2016

(65) Prior Publication Data

US 2016/0333451 A1  Nov. 17, 2016

Related U.S. Application Data

(60) Provisional application No. 62/162,384, filed on May 15, 2015.

(51) Int. Cl.
*C22C 38/60* (2006.01)
*C22C 38/50* (2006.01)
(Continued)

(52) U.S. Cl.
CPC .............. *C22C 38/60* (2013.01); *C21D 6/004* (2013.01); *C21D 6/005* (2013.01); *C21D 6/008* (2013.01);
(Continued)

(58) Field of Classification Search
CPC ................................ C22C 38/60; C21D 6/005
See application file for complete search history.

(56) References Cited

U.S. PATENT DOCUMENTS 2,320,040 A   5/1943   Landis
2,589,881 A   3/1952   Sims et al.
(Continued)

FOREIGN PATENT DOCUMENTS

WO   2010029505 A2   3/2010

OTHER PUBLICATIONS

ASTM International, "Standard Specification for Steel Bars, Alloy, Standard Grades", Designation: A 322-91 (Reapproved 2001).
(Continued)

*Primary Examiner* — Matthew E. Hoban
*Assistant Examiner* — Jeremy C Jones
(74) *Attorney, Agent, or Firm* — Moore & Van Allen PLLC; Jeffrey R. Gray

(57) ABSTRACT

An essentially lead free steel having, in percent by weight (wt-%): Carbon: 0.39-0.43%; Manganese: 0.75-1.00%; Silicon: 0.15-0.35%; Chromium: 0.80-1.05%; Molybdenum: 0.15-0.25%; at least one of Tellurium: 0.003-0.090 wt-%, Selenium: 0.080-0.2 wt-%, Sulfur: 0.065-0.09% wt-%, and Bismuth: 0.03-0.1 wt-%; and the balance being Fe and normally occurring scrap steel impurities. A method for manufacturing an essentially lead free steel by subjecting a hot-rolled steel product to a heat treatment in which the steel product is subjected to a first temperature for a first duration; the steel product is subjected to a second temperature for a second duration, wherein the second temperature is less than the first temperature; and the steel product is subjected to a third temperature for a third time period, wherein the third temperature is greater than the second temperature; and cooling the steel product. After the heat treatment the steel is cold worked to the desired size.

21 Claims, 5 Drawing Sheets

(51) Int. Cl.
*C22C 38/48* (2006.01)
*C22C 38/46* (2006.01)
*C22C 38/44* (2006.01)
*C21D 9/00* (2006.01)
*C22C 38/06* (2006.01)
*C22C 38/04* (2006.01)
*C22C 38/00* (2006.01)
*C21D 6/00* (2006.01)
*C22C 38/54* (2006.01)
*C22C 38/42* (2006.01)
*C22C 38/02* (2006.01)
*C22C 38/22* (2006.01)

(52) U.S. Cl.
CPC .......... *C21D 9/0068* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/22* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *Y02P 10/212* (2015.11)

(56) References Cited

U.S. PATENT DOCUMENTS

| | | |
|---|---|---|
| 2,767,835 A | 10/1956 | Nachtman et al. |
| 2,767,836 A | 10/1956 | Nachtman et al. |
| 2,767,837 A | 10/1956 | Nachtman et al. |
| 2,767,838 A | 10/1956 | Nachtman et al. |
| 2,789,069 A | 4/1957 | Nachtman |
| 2,858,243 A | 10/1958 | Nachtman |
| 2,880,855 A | 4/1959 | Nachtman |
| 2,881,107 A | 4/1959 | Nachtman |
| 2,881,108 A | 4/1959 | Nachtman |
| 2,881,109 A | 4/1959 | Thorn et al. |
| 2,924,543 A | 2/1960 | Nachtman |
| 2,924,544 A | 2/1960 | Nachtman |
| 2,998,336 A | 8/1961 | Nachtman |
| 3,001,897 A | 9/1961 | Nachtman |
| 3,009,843 A | 11/1961 | Nachtman et al. |
| 3,088,855 A | 5/1963 | Nachtman |
| 3,210,221 A | 10/1965 | Nachtman et al. |
| 3,240,634 A | 3/1966 | Nachtman |
| 3,679,400 A | 7/1972 | Nachtman |
| 3,705,020 A | 12/1972 | Nachtman |
| 3,726,669 A | 4/1973 | Breyer et al. |
| 3,799,766 A | 3/1974 | Weigel |
| 3,908,431 A | 9/1975 | Jones et al. |
| 4,040,872 A | 8/1977 | Mudiare |
| 4,088,511 A | 5/1978 | Rowney |
| 4,375,378 A | 3/1983 | Ohtani et al. |
| 4,394,189 A | 7/1983 | Greer |
| 4,457,789 A | 7/1984 | Wilks |
| 4,581,079 A | 4/1986 | Borik |
| 4,714,500 A | 12/1987 | Heller et al. |
| 4,786,466 A | 11/1988 | Holowaty |
| 4,865,805 A | 9/1989 | Holowaty |
| 4,946,645 A | 8/1990 | Namiki et al. |
| 5,279,688 A | 1/1994 | Isokawa et al. |
| 5,922,145 A * | 7/1999 | Watari .................. C22C 38/02 148/320 |
| 6,579,385 B2 | 6/2003 | Yaguchi et al. |
| 6,596,227 B2 | 7/2003 | Shindo et al. |
| 6,773,661 B2 | 8/2004 | Hayaishi |
| 6,838,048 B2 | 1/2005 | Nishi et al. |
| 7,014,812 B2 | 3/2006 | Fukuzumi et al. |
| 7,195,736 B1 | 3/2007 | Iwama et al. |
| 7,445,680 B2 | 11/2008 | Iwama et al. |
| 7,998,285 B2 | 8/2011 | Beguinot et al. |
| 8,540,934 B2 | 9/2013 | Sandstrom et al. |
| 8,876,987 B2 * | 11/2014 | Matsuda ................. C21D 8/02 148/320 |
| 9,322,088 B2 * | 4/2016 | Mizuta ..................... C21D 9/46 |
| 10,100,385 B2 * | 10/2018 | Zhong ..................... C21D 9/46 |
| 10,100,394 B2 * | 10/2018 | Kawabe .................... C23C 2/02 |
| 2003/0152476 A1 | 8/2003 | Matsui et al. |
| 2004/0223867 A1 | 11/2004 | Tsunekage |
| 2005/0022906 A1 | 2/2005 | Harasaki et al. |
| 2005/0025658 A1 | 2/2005 | Matsui et al. |
| 2005/0191203 A1 | 9/2005 | Fujimatsu et al. |
| 2006/0130946 A1 * | 6/2006 | Minamida ................ C21D 8/06 148/595 |
| 2009/0053092 A1 | 2/2009 | Sandstrom et al. |
| 2011/0114231 A1 | 5/2011 | Vanoverberghe et al. |
| 2013/0294961 A1 | 11/2013 | Sandstrom et al. |
| 2014/0219858 A1 | 8/2014 | Kubota et al. |
| 2014/0287263 A1 * | 9/2014 | Kawata ..................... C23C 2/02 428/659 |

OTHER PUBLICATIONS

SAE Bar Compositions [SAE J403].
Mechanical Properties of Steel; https://www.ryerson.com/stocklist.

\* cited by examiner

LEAD FREE STEEL AND METHOD OF MANUFACTURING

CLAIM OF PRIORITY UNDER 35 U.S.C. § 119

The present application for a patent claims priority to U.S. Provisional Patent Application Ser. No. 62/162,384 entitled "Lead Free Steel and Method of Manufacturing" filed on May 15, 2015 and assigned to the assignees hereof and hereby expressly incorporated by reference herein.

FIELD

The present disclosure relates to a steel product with a particular steel composition and method of making the steel product using a specific heat treatment process, one or more of which results in the desired properties of the steel product. Additionally, the present invention relates to a steel product that is essentially free or free of lead, obtainable from scrap steel, having good hardenability, machinability and wear resistance for use as fasteners, hose fittings, shafts, or other like machined components.

BACKGROUND

Free-cutting steels commonly used today often contain lead, which is an effective element for providing machinability. Exemplary lead containing free-cutting steel typically contains 0.2% by weight of lead (Pb), or a range of lead from 0.15% to 0.35%, along with other elements. For example, steel containing lead, such as steel commonly referred to as 41L40 made according to ASTM A-322-91, improves machinability of the steel without sacrificing other desirable properties. These lead containing steels have very good machinability, wear resistance, hardenability, and dimensional stability, and also result in prolonged tool life for the tools that are used to machine the steel, desired machining speeds, desired machining feed rates, and machining productivity during manufacturing of machined components made from these types of lead containing steels. However, lead is a hazardous element for the environment and people. As such, these lead containing steels are not environmentally friendly or safe to make and/or use. For instance, in some regions manufacturing lead containing steels is prohibited, and as a result lead containing steels are often purchased outside of these regions in order to manufacture the desired machined components. In some regions steel containing lead may not even be utilized to make components, regardless of the origin of the steel.

SUMMARY

Some aspects of the invention is a steel composition, which in some cases is free of or substantially free of lead (Pb). In some aspects of the invention, a steel composition, such as a composition that is free of or substantially free of lead (Pb), may be manufactured using a particular heat treatment, such as a particular annealing process. In some aspects of the invention, the steel composition provided is a replacement for 41L40 steel, or other like steels. The presently disclosed composition provides a steel product with improved machinability that can be used in a wide range of machined components, including but not limited to fasteners, hose fittings, shafts, drill collars, couplings, axles, gears, valves, pins, wedges, steering assembly components, die rolls, spindles, or the like.

In some aspects of the invention, the following elements are present in the steel products: carbon in an amount by weight of 0.39-0.43%; Manganese in an amount by weight of 0.75-1.00%; Silicon in an amount by weight of 0.15-0.35%; Chromium in an amount by weight of 0.80-1.05%; and Molybdenum in an amount by weight of 0.15-0.25%. Additionally, in some aspects of the invention, the steel products may include the addition of another element, or combinations of multiple elements, that will improve the machinability, such as but not limited to at least one of tellurium (Te), selenium (Se), sulfur (S), bismuth (Bi), and/or other like elements. In other aspects of the invention, the presently disclosed steel composition may comprise increasing the amount of one or more of these elements that may already be used in currently produced steels, or increasing the amount of combinations of these elements, such as elevating the levels of tellurium (Te), selenium (Se), sulfur (S), bismuth (Bi), or other like elements in these types of steels. In still other aspects of the invention, the amount of tellurium (Te), selenium (Se), sulfur (S), bismuth (Bi), or the like used in the steel may be more finely tuned in order to achieve the desired properties.

Tellurium, in some aspects, may be added to, and/or controlled within, the steel to a range of 0.001 to 0.12 wt-%, and preferably in a range of 0.003-0.090 wt-%.

Selenium, in some aspects, may be added to, and/or controlled within, the steel to a range of 0.05 to 0.25 wt-%, and preferably in a range of 0.08 to 0.2 wt-%.

Sulfur, in some aspects, may be added to, and/or controlled within, the steel to a range of 0.05-0.1 wt-% within the steel. In other aspects, the sulfur may be added to, and/or controlled within, the steel to a range of 0.06-0.1% wt-%. In other aspects, the sulfur may be added to, and/or controlled within, the steel to a range of 0.065-0.09% wt-%. These amounts of sulfur are different than the sulfur content of leaded steels, such as 41L40 steels which typically have lead in a range of 0.15-0.35 wt-%. Some leaded steels may have no sulfur, or sulfur at levels much lower than the levels described herein.

Bismuth, in some aspects of the invention, may be added to, and/or controlled within, the steel to a range of 0.001 to 0.12 wt-%, and preferably in a range of 0.03 to 0.1 wt-%.

In some aspects of the invention, the typical residuals that may be found in scrap steel may be found in the steel described herein. In some aspects of the invention the following elements may be present as a typical residual or may be intentionally added and/or held to the following ranges: copper up to a maximum of 0.50 weight percent (and in some aspects of the invention copper may be limited to a maximum of 0.1% wt-%); calcium up to a maximum of 20 ppm; boron up to a maximum of 10 ppm; and nitrogen in a range of 50 to 150 ppm. In other aspects of the invention, these additional elements, or other elements, may be held to different levels in accordance with various aspects of the invention, as described throughout.

In some aspects of the invention, the presently disclosed composition is prepared from scrap steel where all or substantially all but trace amounts of lead is removed. In such processes scrap steel is supplied to a furnace (e.g., an electric arc furnace or "EAF") in one or more charges and melted. The alloying elements are added or controlled within the furnace or within subsequent processing steps (e.g., in a ladle, or the like). The steel products discussed herein may be formed by strand casting or ingot casting molten steel in a hot forming process into a billet, and subsequently hot rolling the steel products. In some aspects of the invention, the cast billets may be directly hot rolled after casting.

Alternatively, the cast billets may be cooled, which may occur at a controlled rate in order to prevent the formation of imperfections caused by cooling that is too rapid. If cooled, the cast billets will be reheated to a prescribed temperature and reduced in a hot rolling process, and/or potentially a cold rolling process. The steel product may then be subjected to a heat treatment and thereafter cold worked (e.g., cold drawn, cold extruded, and/or cold rolled) to a finished size into a final steel product suitable for machining into a machined component.

The steel products of the present disclosure can also be formed in a blast furnace or other furnace in which the composition of the finished steel can be controlled and a heat treatment can be applied.

Regardless of how the steel product is formed, special care may be given to heating and cooling the steel product during a heat treatment, such as annealing, to ensure proper microstructure and mechanical properties of the final product. In some aspects of the invention, an annealing process is utilized where the product is heated for a predetermined time under particular conditions in one or more steps, subjected to cooling for a predetermined time under particular conditions in one or more steps, then reheated for a predetermined time under particular conditions in one or more steps (e.g., a temperature spike, or the like), and finally, subjected to cooling for a predetermined time under particular conditions in one or more steps. The heating and/or cooling during the one or more heat treatment steps may or may not be performed using a non-ambient atmosphere.

With respect to the composition of the steel in the present invention, in some aspects of the invention, the addition of, or increase in the amount of, at least one or more of Te, Se, S, Bi, and/or other like elements may result in a more adherent scaling after the steel product is formed. The temperature spike (e.g., the increased temperature after the first heating and first cooling) in the presently disclosed annealing process permits removal of the scale more easily in downstream processing when compared to similar steels subjected to a heat treatment without the temperature spike described herein.

In some aspects of the invention, the presently disclosed steel composition, after being subjected to the present heat treatment (e.g., annealing process, or the like), results in a product with a hardness of about 100-225 Brinell Hardness (55-97 Rockwell B). In some aspects of the invention, the presently disclosed steel composition, after being subjected to the present heat treatment provides for a hardness of about 125-210 Brinell Hardness (70-95 Rockwell B).

In some aspects of the invention, the presently disclosed steel composition, after being subjected to the present heat treatment and one or more of cold drawing, cold rolling, and/or extrusion, results in a product with a hardness of about 125-300 Brinell Hardness (70 Rockwell B to 32 Rockwell C). In some aspects of the invention, the presently disclosed steel composition, after being subjected to the present heat treatment and one or more of cold drawing, cold rolling, and/or extrusion provides for a hardness of about 150-260 Brinell Hardness (80 Rockwell B-26 Rockwell C).

In some aspects of the invention, the presently disclosed steel composition after being subjected to the presently disclosed heat treatment (and other potential processing steps) provides for a machinability rating of greater than about 70%, greater than about 75%, greater than about 80%, or greater than about 85% (e.g., up to about 86% or greater than about 86%) of an AISI 1212 steel that provides the baseline for machinability (e.g., a steel with 100% machinability rating).

Aspects of the invention comprise a steel product that is essentially lead free. The steel product composition comprises: carbon in a range of 0.2 to 0.6 wt-%; manganese in a range of 0.6 to 1.1 wt-%; silicon in a range of 0.1 to 0.4 wt-%; chromium in a range of 0.6 to 1.2 wt-%; molybdenum in a range of 0.1 to 0.3 wt-%; at least one or more of: tellurium in a range of 0.001 to 0.12 wt-%; selenium in a range of 0.05 to 0.25 wt-%; sulfur in a range of 0.4 to 0.12 wt-%; or bismuth in a range of 0.01 to 0.15 wt-%; and balance being Fe and normally occurring scrap steel impurities. The steel product is subjected to a heat treatment process during which the steel product is subjected to: a first temperature for a first duration; a second temperature for a second duration, wherein the second temperature is less than the first temperature; and a third temperature for a for a third time period, wherein the third temperature is greater than the second temperature. The steel product is cooled after being subjected to the third temperature during the heat treatment.

In further accord with the invention, the composition of the steel product comprises only the tellurium, and wherein the tellurium is in a range of 0.003 to 0.090 wt-%.

In another aspect of the invention, the composition of the steel product comprises only the selenium, and wherein the selenium is in a range of 0.080 to 0.20 wt-%.

In still another aspect of the invention, the composition of the steel product comprises only the sulfur, and wherein the sulfur is in a range of 0.065 to 0.090 wt-%.

In yet another aspect of the invention, the composition of the steel product comprises only the bismuth, and wherein the bismuth is in a range of 0.03 to 0.1 wt-%.

In further accord with the invention, at the first temperature the steel product is in an austenitic phase, and at the second temperature and the third temperature the steel product is in a pearlitic/ferritic phase.

In another aspect of the invention, the first temperature ranges between 1500-1800 degrees F., the second temperature ranges between 1000-1300 degrees F., and the third temperature ranges between 1100-1400 degrees F.

In still another aspect of the invention, the first temperature ranges between 1590-1690 degrees F., the second temperature ranges between 1100-1200 degrees F., and the third temperature ranges between 1200-1300 degrees F.

In yet another aspect of the invention, the microstructure of the steel product comprises lamellar perlite.

In further accord with an aspect of the invention, the microstructure of the steel product comprises at least 75% lamellar perlite.

Aspects of the invention comprise a method for manufacturing an essentially lead free steel. The method comprises subjecting a hot rolled steel product to a heat treatment. Within the heat treatment the steel product is subjected to a first temperature for a first duration. Then the steel product is subjected to a second temperature for a second duration, wherein the second temperature is less than the first temperature. Then the steel product is subjected to a third temperature for a third time period, wherein the third temperature is greater than the second temperature. The steel product is then subjected to cooling after heat treatment. The steel product has a composition that comprises: carbon in a range of 0.2 to 0.6 wt-%; manganese in a range of 0.6 to 1.1 wt-%; silicon in a range of 0.1 to 0.4 wt-%; chromium in a range of 0.6 to 1.2 wt-%; molybdenum in a range of 0.1 to 0.3 wt-%; and at least one or more of: tellurium in a range of 0.001 to 0.12 wt-%; selenium in a range of 0.05 to 0.25 wt-%; sulfur in a range of 0.4 to 0.12 wt-%; or bismuth in a range of 0.01 to 0.15 wt-%; and the balance being Fe and normally occurring scrap steel impurities.

In further accord with an aspect of the invention, the composition comprises only the tellurium, and wherein the tellurium is in a range of 0.003 to 0.090 wt-%.

In still another aspect of the invention, the composition comprises only the selenium, and wherein the selenium is in a range of 0.080 to 0.20 wt-%.

In yet another aspect of the invention, the composition comprises only the sulfur, and wherein the sulfur is in a range of 0.065 to 0.090 wt-%.

In further accord with an aspect of the invention, the composition comprises only the bismuth, and wherein the bismuth is in a range of 0.03 to 0.1 wt-%.

In another aspect of the invention, at the first temperature the steel product is in an austenitic phase, and at the second temperature and the third temperature the steel product is in a pearlitic/ferritic phase and the third temperature is greater than the second temperature.

In still another aspect of the invention, the first temperature ranges between 1500-1800 degrees F., the second temperature ranges between 1000-1300 degrees F., and the third temperature ranges between 1100-1400 degrees F.

In yet another aspect of the invention, the first temperature ranges between 1590-1690 degrees F., the second temperature ranges between 1100-1200 degrees F., and the third temperature ranges between 1200-1300 degrees F.

In further accord with an aspect of the invention, the microstructure of the steel product comprises lamellar perlite.

In another aspect of the invention, the microstructure comprises at least 75% lamellar perlite.

Aspects of the invention comprise a steel product that is essentially lead free. The steel product comprises: carbon in a range of 0.2 to 0.6 wt-%; manganese in a range of 0.6 to 1.1 wt-%; silicon in a range of 0.1 to 0.4 wt-%; chromium in a range of 0.6 to 1.2 wt-%; molybdenum in a range of 0.1 to 0.3 wt-%; at least one or more of: tellurium in a range of 0.001 to 0.12 wt-%; selenium in a range of 0.05 to 0.25 wt-%; sulfur in a range of 0.4 to 0.12 wt-%; or bismuth in a range of 0.01 to 0.15 wt-%; and the balance being Fe and normally occurring scrap steel impurities.

Aspects of the invention comprise a method for a heat treatment process. The method comprises subjecting a hot rolled steel product to a heat treatment. Within the heat treatment the steel product is subjected to a first temperature for a first duration, wherein the first temperature ranges between 1500-1800 degrees F. Then the steel product is subjected to a second temperature for a second duration, wherein the second temperature ranges between 1000-1300 degrees F., and wherein the second temperature is less than the first temperature. Then the steel product is subjected to a third temperature for a third time period, wherein the third temperature ranges between 1100-1400 degrees F., and wherein the third temperature is greater than the second temperature. After the heat treatment the steel is subjected to a cooling.

To the accomplishment of the foregoing and the related ends, the one or more aspects of the invention comprise the features hereinafter fully described and particularly pointed out in the claims. The following description and the annexed drawings set forth certain illustrative features of the one or more aspects of the invention. These features are indicative, however, of but a few of the various ways in which the principles of various aspects of the invention may be employed, and this description is intended to include all such aspects and their equivalents.

BRIEF DESCRIPTION OF THE DRAWINGS

Figure 1:
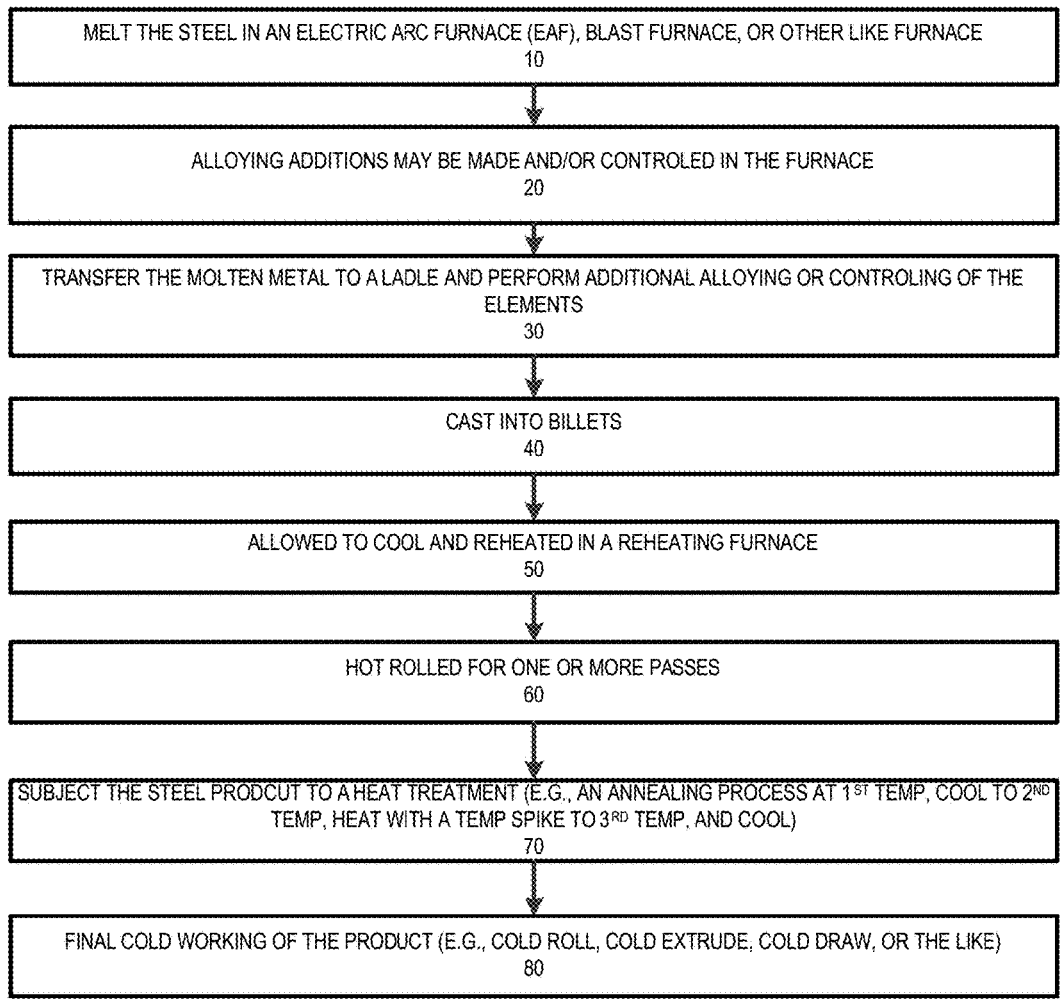

Having thus described aspects of the invention in general terms, reference will be made to the accompanying drawings, where:

FIG. 1 illustrates a process flow for the manufacture of the steel products disclosed herein, in accordance with aspects of the present disclosure.

Figure 2:
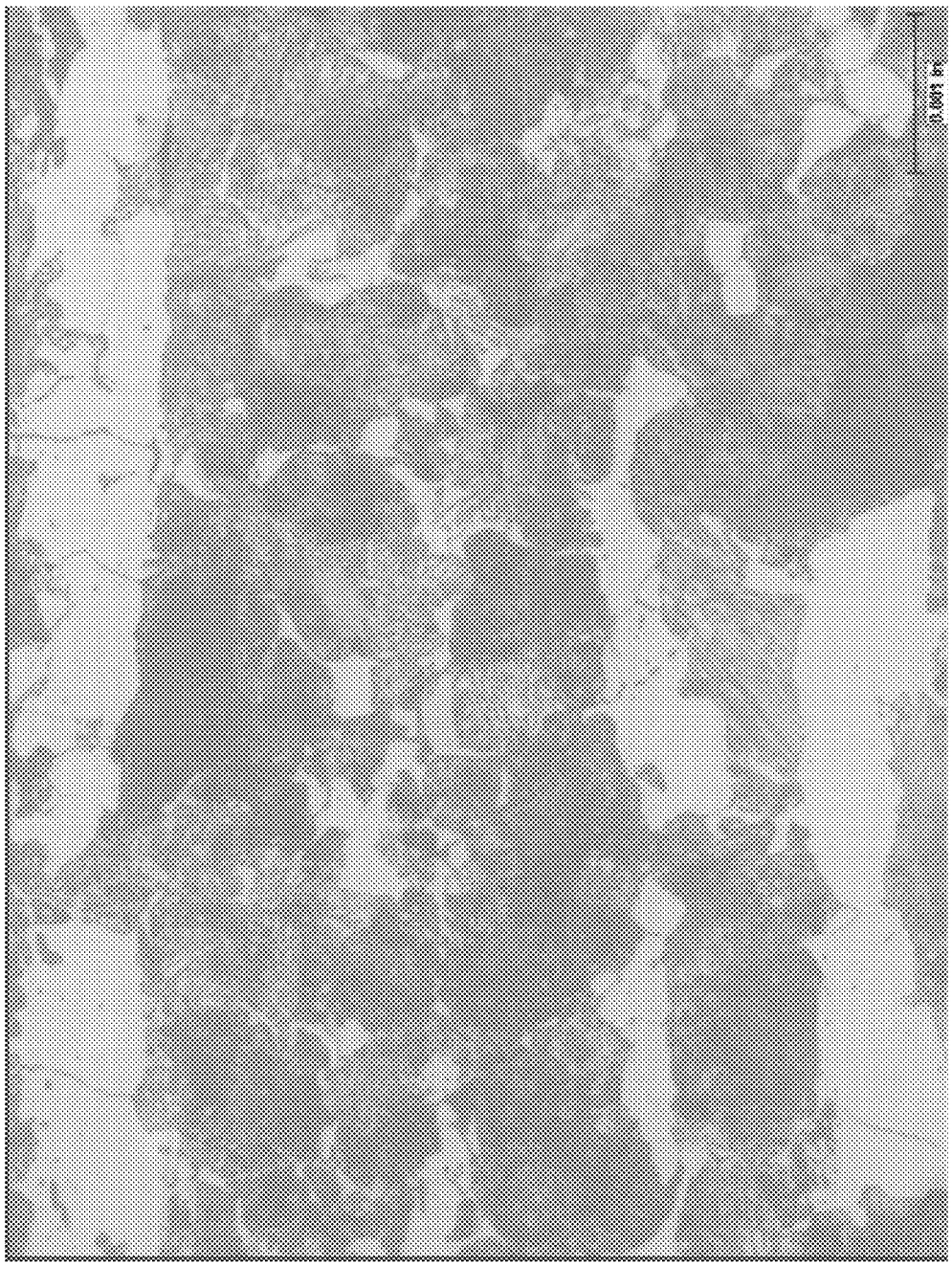

FIG. 2 illustrates the microstructure of a longitudinal cut sample taken near the core of a bar steel product disclosed herein, in accordance with aspects of the present disclosure.

Figure 3:
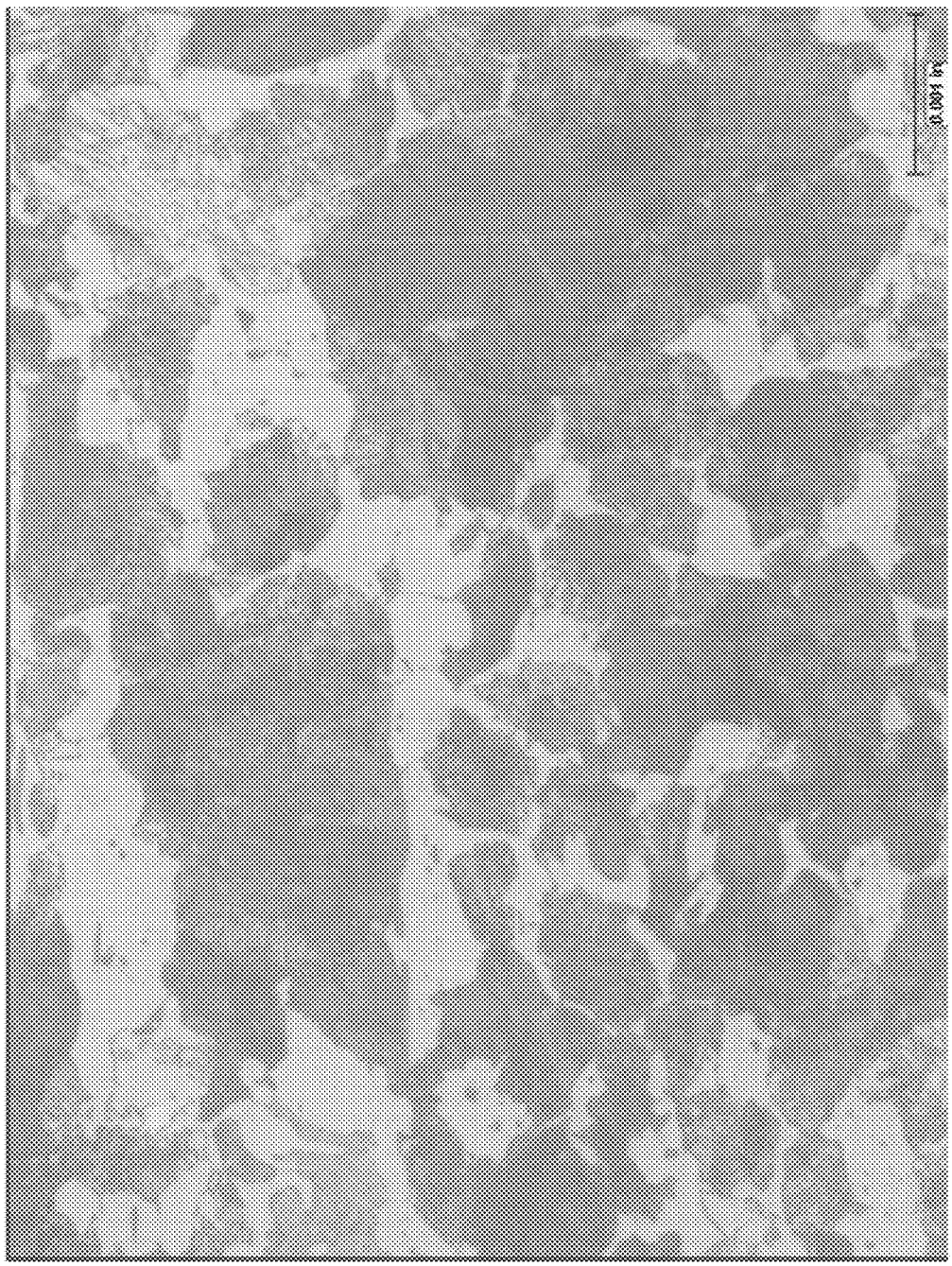

FIG. 3 illustrates the microstructure of a longitudinal cut sample taken near the surface of a bar steel product disclosed herein, in accordance with aspects of the present disclosure.

Figure 4:
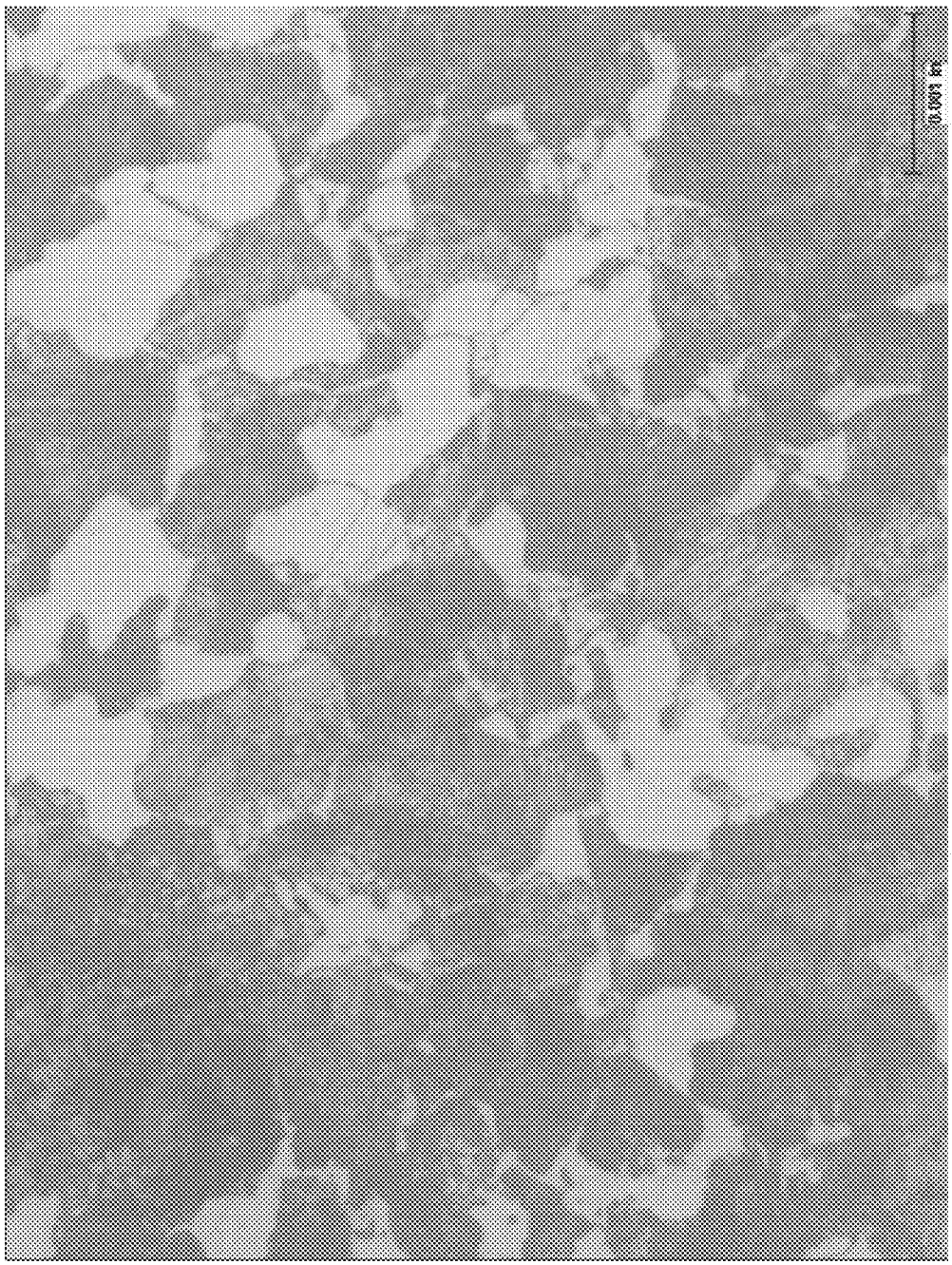

FIG. 4 illustrates the microstructure of a transverse cut sample taken near the core of a bar steel product disclosed herein, in accordance with aspects of the present disclosure.

Figure 5:

FIG. 5 illustrates the microstructure of a transverse cut sample taken near the surface of a bar steel product disclosed herein, in accordance with aspects of the present disclosure.

DETAILED DESCRIPTION

The present disclosure is generally related to manufacturing steel products that have the desired machinability and other properties without utilizing additions of lead. Lead is, or may become, prohibited or limited in its use as an alloying material in steel or as a component of steel used to manufacture machined components. The present invention provides environmentally friendly and non-toxic steels that are non-hazardous for persons in close proximity with the steels during manufacturing, machining, recycling and subsequent use, especially during melting, hot working, or machining of the steels. The steels of the present invention achieve the desired properties without the use of lead based on the steel composition, heat treatment, and/or other factors, which are described in detail herein. Unlike the steels of the present invention, the currently available lead-free free-cutting steels do not provide properties that are satisfactory and in line with the steels that utilize lead.

The invention described herein provides alternative lead-free or substantially lead-free steel products, and processes of manufacturing such steel products, which is not detrimental to the environment or unsafe for persons that come in contact with the steels during manufacture, machining into machined components, or ultimate use of the components, but which also meet the material properties of leaded steels, such as the properties of 41L40 steel, or other like steels.

FIG. 1 illustrates a general process for manufacturing steel products of the present disclosure. As illustrated by block 10 in FIG. 1 molten steel is formed through the use of a blast finance, an electric arc furnace ("EAF"), or other like furnace. Specifically with respect to processing within an EAF, materials such as scrap steel, iron ore, or direct reduced iron may be melted into molten steel within the EAF. As illustrated by block 20, alloys may be added to produce the desired composition of the steel product (as will be discussed in further detail later). The alloys may be added or controlled to some degree in the EAF or other furnace, in the ladle, or in other equipment during the processing of the steel.

As illustrated in block 30 of FIG. 1 the molten steel is transferred from the furnace to a ladle. Thereafter, the molten steel in the ladle may be transferred to a tundish, and thereafter cast into billets, as illustrated by block 40. After being cast, the billet may be cooled and thereafter reheated in a reheating furnace, as illustrated by block 50 in FIG. 1. In some aspects of the invention, after casting the billets may be sent to a tunnel furnace to maintain the desired temperature before being sent for hot rolling or may be sent directly for hot rolling. In still other aspects of the invention the steel may be continuously cast into the steel product and thereafter sent for further processing.

As illustrated by block 60 in FIG. 1, the billets are hot rolled into the bars or other steel products in one or more hot rolling passes through one or more sets of dies. In some aspects of the invention, as illustrated by block 70, one or more cold rolling processes may be performed on the bar or other steel products after hot rolling and before the heat treatment. Thereafter, as illustrated by block 80 the bars or other steel products are subjected to a heat treatment (e.g., annealing process) in accordance with the heat treatment disclosed herein. In some aspects of the heat treatment, the steel product is heated to a first temperature, allowed to cool to a second temperature below the first temperature, heated to a third temperature between the first temperature and the second temperature (e.g., using a temperature spike), and thereafter allowed to cool. Each of the heat treatment steps described above may occur in one or more sub-steps and/or sub-temperatures.

As illustrated by block 90, after the heat treatment the steel products may be cold worked, for example, through a cold drawn, cold extrusion, or cold rolling process, into the desired final steel product, which can then be machined, formed, or otherwise processed into the desired components, such as machined components.

The composition of the steel in the present disclosure includes elements, such as tellurium, selenium, sulfur, bismuth, and/or other like, which are added to, or controlled within, the steel composition. Alternatively, if one or more of these elements currently exist in a steel composition, the amount of one or more of these elements may be increased to levels higher than the ordinary levels of these elements. In either case, for steels having lead, with the addition, and/or the increased amount, of tellurium, selenium, sulfur, bismuth, and/or other like elements in the steel, the purposeful addition of lead is eliminated (e.g., with the exception of trace elements of lead that may be found in scrap steel, or the like). Additionally, the specific heat treatment process described herein includes annealing steel made from the composition to temperatures in which the steel product is in an austenitic phase, cooling the steel product to a temperature at which it is below an austenitic phase (e.g., pearlitic/ferritic phase), heating the steel product back up to a temperature at which the steel product remains in the pearlitic/ferritic phase (e.g., a rapid temperature spike), and cooling the steel product thereafter (e.g., cooling after the temperature spike in a controlled process). This heat treatment, along with the composition of the present invention, results in a desired steel product with the same or similar properties as lead alloy steels, such as but not limited to having the desired machinability, wear resistance, hardenability, and dimensional stability, as well as resulting in prolonged tool life of the tools used to machine the steel products, desired machining speeds, feed rates, and productivity during manufacturing of machined components made from the steel products described herein. For example, the steels produced from the composition and/or heat treatment described herein may results in small machining chips. It may be desirable to create small chips during machining as opposed to long pieces of metal shavings. The long pieces of metal shavings may interfere with the machine tooling and/or the machined components, whereas small chips do not have the same interference issues.

The term "machinability", as described herein, is a relative measure of how easily a material can be machined when compared to American Iron and Steel Institute (AISI) 1212 steel. In accordance with the AISI specification, turning tests of AISI 1212 steel represent a 100% rating, if the material being compared has a turning test result that is less than 100% it is more difficult to machine, while a turning test result that exceeds 100% would be easier to machine. Based on the composition and process of forming the steel product, including the heat treatment, the machinability of aspects of the present invention may be up to about 86%, or greater than about 70%, greater than about 75%, greater than about 80%, greater than about 85%, greater than about 90%, or cover a range between any values anywhere in-between two or more of these values, or values between these which are not specifically stated. As such, the steel products of the present invention may have the same or similar machinability as similar steels that include lead (e.g., 41L40, or other like leaded steels). It should be understood that the lead-free or substantially lead-free steels described herein may have the same or similar machinability of leaded steels regardless of the machinability of the steels (e.g., regardless if they are above or below 100% machinability). That is, the comparison is made between the machinability of comparable lead-free and leaded steels.

The composition of the lead-free or substantially lead-free steels may be defined by one or more elements described herein, and may be present as controlled elements or as unavoidable impurities of the steel making process (e.g., based on the scrap steel utilized, or the like), with the remaining portion of the steel material being iron (Fe). For example, Table 1 below lists potential elements for the steels of the present invention with one or more percent weight ranges. Additional ranges of these elements and the effect of at least some of these elements on the steels of the present invention are described in further detail below. As illustrated in Table 1, the elements from carbon to oxygen may be controlled, while the elements from Vanadium to Titanium may or may not be controlled.

It should be understood that the term "about" may be added to the description of the values for the ranges of elements, temperatures, times, percentages, or the like discussed herein. As such, the term "about" is intended to encompass the measurement error associated with the numerical value described thereafter (e.g., +/−1, 2, 3, 4, 5, 6, 7, 8, 9, 10 unit, such as fraction of a percent, percent, or the like). Moreover, it should be understood that the ranges of a particular element may be a combination of any values, or ranges of values described for the particular element, or may be within, overlapping, or outside of a particular range provided.

TABLE 1

Potential elements and potential ranges of each, which may be controlled or may appear as unavoidable impurities.

| Element | Preferred Range (wt-% unless stated otherwise) | Other Range(s) (wt-%) |
|---|---|---|
| Carbon (C) | 0.39 to 0.43 | 0.2 to 0.6 |
| Manganese (Mn) | 0.75 to 1.0 | 0.6 to 1.1 |
| Silicon (Si) | 0.15 to 0.35 | 0.1 to 0.4 |
| Chromium (Cr) | 0.8 to 1.05 | 0.6 to 1.2 |
| Molybdenum (Mo) | 0.15 to 0.25 | 0.1 to 0.3 |
| Tellurium (Te) | 0.003 to 0.090 | 0.001 to 0.12 |
| Selenium (Se) | 0.08 to 0.2 | 0.05 to 0.25 |
| Sulfur (S) | 0.065 to 0.09 | 0.04 to 0.12 |
| Bismuth (Bi) | 0.03 to 0.1 | 0.01 to 0.15 |
| Nitrogen (N) | 1-100 ppm; 50-150 ppm | 0.08 max; or 0.0001 to 0.08 |
| Oxygen (O) | 1 to 30 ppm | 0.005 max; or 0.0001 to 0.005 |
| Vanadium (V) | 0.01 max | 0.02 max; 0.03 max; or 0.0001 to 0.03 |
| Phosphorus (P) | 0.03 max | 0.04 max; 0.05 max; or 0.0001 to 0.05 |
| Copper (Cu) | 0.1 max | 0.25 max; 0.5 max; or 0.0001 to 0.5 |
| Nickel (Ni) | 0.2 max | 0.3 max; 0.5 max; or 0.0001 to 0.5 |
| Aluminum (Al) | 0.01 max | 0.02 max; 0.04 max; or 0.0001 to 0.04 |
| Niobium (Nb) | 0.01 max | 0.02 max; 0.03 max; or 0.0001 to 0.04 |
| Lead (Pb) | 0.02 max | 0.03 max; 0.05 max; or 0.0001 to 0.05 |
| Tin (Sn) | 0.03 max | 0.04 max; 0.06 max; or 0.0001 to 0.06 |
| Calcium (Ca) | 0.002 max | 0.005 max; 0.01 max; 0.00001 to 0.002 |
| Boron (B) | 0.0005 max | 0.001 max; 0.005 max; 0.0001 to 0.005 |
| Titanium (Ti) | 0.1 max | 0.2 max; 0.3 max; 0.0001 to 0.3 |

Carbon added in certain amounts will improve the hardness of the steel product. Too high of an amount of carbon may, however, deteriorate the machinability. Therefore, the upper limit of carbon, when considered in combination with other elements in the steel should be about 0.2 wt-% to about 0.6 wt-% to avoid a decrease of the machinability. The lower limit of carbon should be about 0.2 wt-%, 0.3 wt-% or 0.4 wt-%. In some aspects of the invention the carbon content may range from 0.39 wt-% to 0.43 wt-%. Low carbon content is beneficial for the machinability, but has a detrimental effect on other properties (e.g., becomes less hard, loses strength, and becomes more ductile). These detrimental effects can be neutralized by adjusting amounts of alternative elements, for example Mn, Te, Se, S, Bi, and/or other like elements, as described below.

Silicon has a solution hardening effect (e.g., strengthen the metal). Silicon also increases the carbon activity during heat treatment (e.g., reaction between the Si and C). Moreover, due to its high affinity to oxygen, silicon is often used to deoxidize steel during manufacture in order to improve the purity of the material. These effects are not available at a silicon content less than 0.1 wt-%. At high silicon contents, the hot forming processability deteriorates. Therefore, in steels of the present disclosure the silicon content should not exceed 0.4 wt-%. In some aspects of the invention the silicon content may range from about 0.15 wt-% to about 0.35 wt-%.

Molybdenum increases the hardenability of the steel product. However, a high molybdenum content might impair the hot workability of the steel. As such, the upper limit for molybdenum should be 0.3 wt-% in the steel of the present disclosure, preferably maximally 0.25 wt-%. In some aspects of the invention the molybdenum may range from about 0.15-0.25 wt-%.

Tellurium (Te), selenium (Se), Sulfur (S), Bismuth (Bi), and/or other like elements increase the machinability of the steel.

With respect to Tellurium (Te), it reacts with manganese to form manganese telluride in the solid steel product and has a similar effect as adding lead. It also acts to modify the shape of manganese sulphide inclusions from elongated to a globular morphology. The Te content in the present composition that achieves the improvements described herein and permits the heat treatment described herein to result in the removal of scale using traditional methods, may range from 0.001 to 0.12 wt-%, and preferably may range from 0.003-0.090 wt-%.

With respect to Selenium (Se), this addition modifies the shape of manganese sulphide inclusions enhancing machinability. The Se content in the present composition that achieves the improvements described herein, and allows for the heat treatment described herein to result in the removal of scale using traditional methods, may range from 0.05 to 0.25 wt-%, and preferably may range from 0.08 to 0.2 wt-%.

With respect to Sulfur (S), this addition forms with other elements to create sulphides (e.g. manganese sulphides, or the like). Sulphides readily undergo plastic deformation during rolling, forging or cold working (e.g., cold drawing, or the like), and increased sulphides result in drastically reducing tool wear during machining. The sulfur content in the present composition that achieves the improvements described herein, and permits for the heat treatment described herein to result in the removal of scale using traditional methods, is elevated compared to sulfur levels in other types of steels (e.g., 41L40 steel), such as 0.04 wt-% or more, preferably at least 0.05 wt-%, more preferably in a range of about 0.065 wt-% to about 0.090 wt-%. Therefore, the sulfur content should be minimally 0.04 wt-% and maximally 0.12 wt-%.

With respect to Bismuth (Bi), this forms discrete particles in the steel structure on solidification, often present as tails on manganese sulphide inclusions. During machining, the Bi melts locally at the tool-steel product workpiece interface acting as a lubricant and reducing tool wear. The Bi content in the present composition that achieves the improvements described herein, and allows for the heat treatment described herein to result in the removal of scale using traditional methods, may range from 0.01 to 0.15 wt-%, and preferably may range from 0.03 to 0.1 wt-%.

Manganese influences the morphology of the sulphides. Mn in combination with Te, Se, S, and/or Bi enhances the size and shape of the MnS inclusions leading to improved machinability. Manganese also leads to a tendency of increased work hardening and higher hardenability. Large amounts of manganese in a free-cutting steel can, however, reduce the corrosion resistance. In combination with the sulfur, a manganese content less than about 0.7 wt-% would lead to an insufficient amount of sulphides, while an excess amount of manganese, more than 1.1 wt-%, results in an increased tendency of work hardening, which in turn leads to decreased machinability. Preferably, the Mn content is about 0.6-1.1 wt-%, more preferably 0.75-1.0 wt-%.

Chromium is an element that improves the hardenability and corrosion resistance. In the present disclosure, the chromium content should be maximally about 1.1 wt-% to avoid any negative effects on the properties of the material (e.g., too hard for desired machinability). Preferably, the chromium content should be 0.7-1.1 wt-%, more preferably 0.8-1.05 wt-%.

The previously recited elements discussed above may be controlled to the illustrated ranges. The following elements discussed below may also be controlled in some aspects of the invention. However, in other aspects of the invention the following elements may appear as impurities within the steel because they are a part of the scrap steel utilized to create the steel of the present invention.

Boron enhances the hardenability of the steel, and also in small amounts improves the hot workability. However, formation of boron nitrides is sometimes considered to cause increased tool wear due to the relatively high hardness of the formed inclusions. Boron in excessive amounts is also generally considered to cause poor hot ductility of the material. Consequently, the boron content may be maximally 0.008 wt-% in the steel, preferably maximally 0.0010 wt-%, or 0.0005 wt-%. In some aspects of the invention the boron may be added and controlled, but in other aspects the boron exists as a trace element from the boron in the scrap steel, which may or may not be controlled.

Copper may provide a positive effect on the machinability in regards to tool lifetime, such as at turning. Copper may provide improved corrosion properties, and in particular it may reduce the rate of general corrosion. However, if added in an amount that is too high, copper may lower the hot ductility of the material and deteriorate the ability to create small chips during machining. As previously discussed, small chips may be desirable to prevent long pieces of metal shavings from interfering with the machine tooling and/or the machined components. Copper may therefore be present in scrap steel in an amount of up to 2.0 wt-%. According to some aspects of the invention, the alloy may contain up to 0.35 wt-% copper. However, it may be advantageous to limit the copper to 0.25 wt-% max, or 0.1 wt-% max in some aspects. In some aspects of the invention, the copper may be added and controlled, but in other aspects the copper exists as trace elements from the copper in the scrap steel, which may or may not be controlled.

Nickel may be present in small amounts in scrap steel or may be added, and may or may not be controlled. Nickel does not have a substantial effect on machinability, but it may be used to increase strength, improve wearability, and/or improve corrosion resistance. Due to high costs for nickel alloys, the nickel content normally in scrap steel may be below 1 wt-%, preferably maximally 0.5 wt-%, more preferably maximally 0.2 wt-%.

Titanium content should be as low as possible to avoid formation of inclusions of titanium nitrides or carbides. These inclusions are very hard and will lead to increased tool wear. Hence, the titanium content should be as low as possible. As such, titanium may be kept to 0.2 wt-% max, more preferably 0.1 wt-% max, 0.05 wt-% max, or the like.

Vanadium combines with nitrogen and carbon to form nitrides and carbides, which prevents grain growth (e.g., reduce grain size) in the steel. However, vanadium nitrides and/or carbides have the same effect as titanium nitrides and/or carbides on the tool wear, which means that the vanadium content should also be as low as possible. As such, Vanadium may be kept to 0.03 wt-% max, or more preferably 0.01 wt-% max, 0.005 wt-% max, or the like.

Niobium normally is useful to prevent coarsening of the crystal grains in the steel at high temperature, but endogenously formed niobium nitrides will have a detrimental effect on the machinability. Consequently, the niobium content should be kept as low as possible. As such, niobium may be kept to 0.03 wt-% max, or more preferably 0.01 wt-% max, 0.005 wt-% max, or the like.

To avoid negative effects on the machinability, the sum of the titanium, niobium, vanadium, and/or zirconium additions (or trace amounts from the scrap steel) may be maximally 0.3 wt-%, or more preferably 0.2 wt-%. In some aspects of the invention, other than present as trace impurities due to the nature of the scrap steel, the present composition is free from additions of titanium, niobium, zirconium and vanadium.

The steel product may also contain normally occurring impurities due to the raw material used, scrap steel used, and/or the manufacturing process selected. The content of these impurities may be included (or in some aspects controlled) such that the properties of the produced steel are substantially unaffected by the presence of these impurities. One example of such an impurity is nitrogen which is suitably kept below 0.08 wt-%. In some aspects of the invention the nitrogen content may be between 50-150 ppm. Other examples are phosphorous, aluminum, and/or other elements that may or may not be illustrated in Table 1, the amounts thereof may or may not be carefully monitored.

With respect to the heat treatment process (e.g., annealing process) of the present disclosure, in some aspects, heating and/or cooling of the steel product in accordance with the methods described herein can be performed using a non-ambient atmosphere, such as >99% nitrogen, or can be a mixture of gases (e.g., mixture of nitrogen, propylene, oxygen, or the like). In some aspects of the invention, heating and/or cooling of the steel product in accordance with the methods described herein can be performed using a mixture of nitrogen and one or more hydrocarbons. In some aspects of the invention, heating and/or cooling of the steel products in accordance with the methods described herein can be performed using a mixture of nitrogen, oxygen, and one or more hydrocarbons. For example, heating and/or cooling of the steel product in accordance with the annealing process described herein can be performed using a mixture of nitrogen, oxygen, and ethane and/or propane. Inert gases, such as argon, krypton, or neon can be mixed or added to the atmosphere during the heating/cooling method.

In some aspects of the invention, the method of improving the machinability of an essentially lead free steel comprises subjecting a steel product to a first heat treatment at a first temperature (e.g., 1500-1800 degrees F., or 1590-1690 degrees F.) for a first time period, and subsequently subjecting the product to a second heat treatment, the second heat treatment occurring at a second temperature (e.g., 1000-1300 degrees F., or 1100-1200 degrees F.) lower than the first temperature for a second time period. The method further comprises, subsequent to the duration of the second time period, subjecting the steel product to a third heat treatment at a third temperature (e.g., 1100-1400 degrees F., or 1200-1300 degrees F.) higher than the second temperature for a third period (e.g., heating the product back up, such as in a temperature spike, and/or holding the steel product at a third temperature). The method further comprises, subsequent to the duration of the third time period, subjecting the steel product to a furnace cool (e.g., shutting off the heat and allowing the product to cool, controlled cooling, or the like). It should be understood that any of these time periods may include one or more sub-time periods during which the steel product is heated or cooled at one or more temperatures.

In some aspects of the invention, the steel products may be heated up to a first temperature above the austenitizing range over a desired span of time in one or more process steps and held at the first temperature for a desired duration. As such, the steel products may be heated up until they have a microstructure in the austenitic phase. Thereafter, the temperature of the steel products may be lowered from above the austenitizing range to below the austenitizing range over a desired span of time in one or more process steps and held at a second temperature for a desired span of time. At this second temperature the steel products may be in the pearlitic/ferritic phase. Thereafter, the temperature of the steel products may be increased while staying in the pearlitic/ferritic phase over a desired time period, and held at this third temperature for a desired span of time (e.g., a rapid temperature spike, or the like). In some aspects of the invention, this increase in temperature may be a sharp rise in temperature over a short span of time (e.g., approximately a 50 to 125 degree increase over 5 to 12 minutes, or the like). Finally, the temperature of the steel products may be lowered over a desired span of time to cool the steel product as a finishing step of the heat treatment. It should be noted that each step may contain one or more steps including different temperatures and times at those temperatures to achieve proper physical and microstructural results.

In some aspect discussed below (e.g., with respect to the sample specimens as discussed below), the steel product may be subjected the heat treatments, or portions thereof, illustrated in Tables 2 or 3 at temperatures and for durations which fall within the recited ranges.

As shown in Tables 2 and 3, in one aspect the method comprises subjecting a steel product to a first heat schedule as shown in segments 1-4 for a first time period and subsequently subjecting the steel product to a second heat schedule of a temperature lower than the first heat for a second time period, as shown in segments 5-7. The method further comprises, subsequent to the duration of the second time period, as shown in segments 8-10, subjecting the steel product to a third heat schedule of a temperature less than the second heat schedule for a third period. The method further comprises, subsequent to the duration of the third time period, as shown in segments 11-12, subjecting the steel product to a fourth heat schedule of a temperature greater than the third heat for a fourth period. The method further comprises, as shown in segment 13, subsequent to the duration of the fourth time period, subjecting the steel product to cooling. In addition to the ranges illustrated in Tables 2 and 3 the temperatures for segments 1-5 can be held to a +0/−50 F deviation. The heat temperatures for segment 6 can be held to a +0/−25 F deviation. The heat temperatures for segment 7 can be held to a +0/−50 F deviation. In still other aspects of the invention, in addition to the ranges illustrated for the temperatures in Tables 2 and 3, the deviation for any one of the values within the range may be +/−10, 20, 30, 40, or 50 degrees F. Moreover, with respect to the time durations illustrated for each of the segments, the deviations of the ranges, or values within may be held to +/−10, 20, 30, 40, 50, or 60 mins.

TABLE 3

Heat Treatment Segments and Duration Ranges

| Segment | Initial SetPoint (° F.) | End SetPoint (° F.) | Time (hr:mins) | Atmosphere |
| --- | --- | --- | --- | --- |
| 1 | 0 | 1020-1060 | 0:20-0:40 | N2, Propylene, O2 |
| 2 | 1020-1060 | 1170-1210 | 2:30-3:30 | N2, Propane, O2 |
| 3 | 1170-1210 | 1610-1650 | 0:20-0:40 | N2, Propane, O2 |
| 4 | 1610-1650 | 1610-1650 | 1:10-1:50 | N2, Propane, O2 |
| 5 | 1610-1650 | 1550-1590 | 0:30-0:50 | N2, Propane, O2 |
| 6 | 1550-1590 | 1550-1590 | 0:20-0:40 | N2, Propane, O2 |
| 7 | 1550-1590 | 1550-1590 | 1:10-1:50 | N2, Propane, O2 |
| 8 | 1550-1590 | 1120-1160 | 1:40-2:20 | N2, Propane Off |

TABLE 2

Heat Treatment Segment Temperature and Duration Ranges

| Segment | Initial SetPoint (° F.) | End SetPoint (° F.) | Time (hr:mins) | Atmosphere |
| --- | --- | --- | --- | --- |
| 1 | 0 | 900-1200 | 15 to 45 mins. | N2, Propylene, O2 |
| 2 | 900-1200 | 1050-1350 | 2.5 to 3.5 hr. | N2, Propane, O2 |
| 3 | 1050-1350 | 1500-1800 | 15 to 45 mins. | N2, Propane, O2 |
| 4 | 1500-1800 | 1500-1800 | 1 to 2 hr. | N2, Propane, O2 |
| 5 | 1500-1800 | 1425-1725 | 20 to 60 mins | N2, Propane, O2 MV |
| 6 | 1425-1725 | 1425-1725 | 15 to 45 mins | N2, Propane, O2 |
| 7 | 1425-1725 | 1425-1725 | 1 to 2 hr. | N2, Propane, O2 |
| 8 | 1425-1725 | 1000-1300 | 1.5 to 2.5 hr. | N2, Propane Off |
| 9 | 1000-1300 | 1000-1300 | 35 to 75 mins | N2, Propane Off |
| 10 | 1000-1300 | 1000-1300 | 1 to 10 mins | N2, Propane Off |
| 11 | 1000-1300 | 1100-1400 | 1 to 20 mins | N2, Propane Off |
| 12 | 1100-1400 | 1100-1400 | 45 to 75 mins | N2, Propane Off |
| 13 | 1100-1400 | 50-350 | 15 to 45 mins | N2, Propane Off |
| 14 | 50-350 | 1-50 | END | |

TABLE 3-continued

Heat Treatment Segments and Duration Ranges

| Segment | Initial SetPoint (° F.) | End SetPoint (° F.) | Time (hr:mins) | Atmosphere |
|---|---|---|---|---|
| 9 | 1120-1160 | 1120-1160 | 0:40-1:10 | N2, Propane Off |
| 10 | 1120-1160 | 1120-1160 | 0:01-0:10 | N2, Propane Off |
| 11 | 1120-1160 | 1220-1260 | 0:05-0:15 | N2, Propane Off |
| 12 | 1220-1260 | 1220-1260 | 0:45-1:15 | N2, Propane Off |
| 13 | 1220-1260 | 170-210 | 0:20-0:40 | N2, Propane Off |
| 14 | 200 | 20-60 | END | |

In some aspects of the invention steel samples were made in which the composition included approximately C: 0.39-0.43 wt-%; Mn: 0.75-1.0 wt-%; Si: 0.15-0.35%; Cr: 0.80-1.05; Mo: 0.15-0.25; and one or more of Te: 0.003-0.090 wt-%; Se: 0.080-0.200 wt-%; S: 0.065-0.09 wt-%; Bi: 0.030-0.100 wt-%; and balance being Fe and normally occurring scrap steel impurities.

Sample alloys were produced in an EAF by melting scrap steel with subsequent alloying addition at the Ladle Metallurgy Furnace and casting into billets. The billets were then placed in a reheat furnace to bring them to a desired temperature (e.g., 1700 to 2500 degrees F., or another like range that is inside, overlapping, or outside of this range) over a desired time (e.g., 30 mins to 5 hours, or another like range inside, overlapping, or outside of this range). After reheating, the samples were taken from the furnace at the desired temperature (e.g., 1700 to 2500 degrees F., or in another like range inside, overlapping, or outside of this range) for rolling, and/or other steps. The samples were made with roughing, breakdown, and/or finishing steps, with multiple rolling stands included in each step according to reduction requirements based on the desired size of the finished steel product samples (e.g., bar product diameter, or the like). The steel product samples were rolled into straight bars. In other aspects of the invention, the steel products may be straight bars or rolled into coils as required for further processing steps. Once the steel product samples were rolled to the desired size and shape they were cut to the desired length and subjected to the heat treatments described in Tables 2 and 3 discussed above. The heat treatment, including the heating and cooling segment stages discussed herein, can include multiple steps and temperatures in order to allow the steel products meet the physical and dimensional requirements (e.g., Tables 2 and 3). After heat treatment the steel product samples were subjected to a cold drawing process during which they were formed into the desired steel product shape. The steel product samples were then machined and tested verses comparable steels, such as 41L40 steels.

The samples of the steel products made according to the compositions and the processing, including the heat treatment, described herein, did not illustrate any deficiency in machinability, tool life, machining speed, machining feed rates, or machining productivity when being machined into machined products, when compared to steel compositions that utilize lead and are formed using traditional processing. The steels of the present invention included the additions, and/or increases, of Te, Se, S, Bi, and/or other elements described herein, and were formed utilizing the heat treatment described herein. As such, the steel of the present invention that are free, or are substantially-free, of lead are at least as good, if not superior to, comparable leaded steels, such as the 41L40 steel, or other like leaded steel grades.

Investigations of the microstructures of the steel product samples having the compositions and heat treatment described herein, and certified to ASTM A-108 cold finishing dimensional requirements, showed a mostly lamellar perlite microstructure after the heat treatment. The samples prepared in accordance with the compositions and methods disclosed herein showed at least a 50% lamellar perlite microstructure, at least a 60% lamellar perlite microstructure, at least a 70% lamellar perlite microstructure, at least a 75% (or about 70-80%, or the like) lamellar perlite microstructure, or at least a 85% (or about 85 to 90%, or the like) lamellar perlite microstructure after the heat treatment. It should be understood that the ranges of the lamellar perlite microstructure of the steels produced using the compositions and heat treatment described herein may be within, outside, and/or overlapping any of the ranges or two or more of the values described herein.

The heat treatment performed on the steel products discussed herein will change the microstructure and physical properties of the steel products. The steel products may have a softer and more ductile microstructure when compared to steels formed without a heat treatment. The yield and tensile strength of the steel products will decrease, while the elongation and reduction of area properties will increase after heat treatment when compared to steels without a heat treatment. The annealing process softens the steel products with the result that it increases the life of the dies used in the cold working (e.g., cold drawing, cold rolling, or cold extrusion process). Cold working will in turn increase the yield and tensile strength, and lower the elongation and reduction of the cross-sectional area of the steel products. The yield and tensile strength after cold drawing will increase, but not to the levels that could have been achieved prior to heat treatment. The elongation and reduction of the cross-sectional area will decrease, but will be higher than prior to heat treatment. The finished product after heat treatment and cold drawing will have physical and microstructural properties (e.g., as described below) that enhance machinability while keeping the physical properties such as yield strength, tensile strength, % elongation, and % reduction of cross-sectional area at the same or similar acceptable levels when compared to similar steels, such as but not limited to 41L40 type steels.

Examples of the microstructure of one of the samples are illustrated in FIGS. 2-5. FIG. 2 illustrates 500× magnification of a longitudinally cut sample of the steel discussed herein in the hot rolled and annealed condition near the core the bar. FIG. 2 illustrates the predominantly lamellar pearlitic microstructure with ferrite bands in the rolling direction. FIG. 3 illustrates 500× magnification of a longitudinally cut sample of the steel discussed herein in the hot rolled and annealed condition near the surface of the bar. FIG. 3 illustrates the predominantly lamellar pearlitic microstructure (i.e., darker areas) with ferritic microstructure interspersed (e.g., lighter areas). FIG. 4 illustrates 500× magnification of a transverse cut sample of the steel discussed herein in the hot rolled and annealed condition near the core of the bar. FIG. 4 illustrates the predominantly lamellar pearlitic microstructure with ferritic microstructure. FIG. 5 illustrates 500× magnification of a transverse cut sample in the hot rolled and annealed condition near the surface of the bar. FIG. 5 illustrates the predominantly lamellar pearlitic microstructure with ferritic grains throughout.

The results of the machining tests of the sample steel products indicate that the addition of, and/or the elevated amounts of, Te, Se, S, and/or Bi have a beneficial effect on machinability and hardenability when compared to steel products that do not use, or have amounts of these elements outside of the ranges discussed herein. For example, as described herein, the addition of, or the increased amount of, Te, Se, S, or Bi when compared to conventional amounts of these elements, allows the steel product to have the desired machinability and/or hardness when compared with similar steels containing lead.

Additionally, the present composition, in combination with the heat treatment provides additional manufacturing benefits and advantages. For example, because of the addition of, or the increased amount of, Te, Se, S, Bi, or the like in place of lead, scaling of the product is more adherent to the steel products when compared to steel products without or with lower amounts of Te, Se, S, Bi, and/or other elements. However, the various aspects of the heat treatment disclosed herein make the scaling less adherent to the steel product and consequently, the steel product is easier to descale. As such, the heat treatment provides for the ability to add, and/or utilize higher levels of, Te, Se, S, Bi, or other components in the steel products to improve machinability (e.g., on par or better than steels that use lead), and maintain the use of traditional scaling removal processes (e.g., sand blasting, shot blasting, or the like) to remove scaling from the steel products of the present invention.

The increase in machinability without using lead is dependent on the use of, or the increased amounts of, one or more of the Te, Se, S, Bi, or other elements in the composition of the steel in the present invention, either alone, or in combination with, the heat treatment processing described herein. The present disclosure improves the machinability of the material, without the need for lead (or with only trace elements of lead from scrap steel) and without detriment of the other material properties of the steel (e.g., comparable or the same as the 41L40 steel, or other like similar steel grades). For example, the machinability, as previously described may be up to or above about 75%, 80%, 85%, 86%, or the like, or within or overlapping any ranges or values thereof. Moreover, the wear resistance and corrosion resistance of the end product is the same as or similar to comparable leaded products.

The steel according to the present disclosure can be produced by conventional melting processes, such as in a Blast Furnace, Electric Arc Furnace, or the like. However, it should be understood that the steel products of the present invention may be made utilizing any type of steel manufacturing process, and the same benefits may be achieved.

While certain exemplary aspects have been described and shown in the accompanying drawings, it is to be understood that such aspects are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described aspects of the invention can be configured without departing from the scope and spirit of the invention. Therefore, it is to be understood that, within the scope of the appended claims, the invention may be practiced other than as specifically described herein.

Also, it will be understood that, where possible, any of the advantages, features, functions, devices, and/or operation of any of the aspects of the present invention described and/or contemplated herein may be included in any of the other aspects of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

What is claimed is:

1. A method for manufacturing an essentially lead free steel, the method comprising:
    subjecting a hot rolled steel product to an annealing heat treatment in which
        the steel product is subjected to a first temperature for a first duration;
        the steel product is subjected to a second temperature for a second duration, wherein the second temperature is less than the first temperature; and
        the steel product is subjected to a third temperature for a third duration, wherein the third temperature is greater than the second temperature, and wherein an increase from the second temperature to the third temperature occurs over a duration that is greater than or equal to 5 minutes;
    cooling the steel product; and
    wherein the steel product comprises the following composition:
        carbon in a range of 0.2 to 0.6 wt-%;
        manganese in a range of 0.6 to 1.1 wt-%;
        silicon in a range of 0.1 to 0.4 wt-%;
        chromium in a range of 0.6 to 1.2 wt-%;
        molybdenum in a range of 0.1 to 0.3 wt-%;
        at least one or more of:
            tellurium in a range of 0.001 to 0.12 wt-%;
            selenium in a range of 0.05 to 0.25 wt-%;
            sulfur in a range of 0.04 to 0.12 wt-%; or
            bismuth in a range of 0.01 to 0.15 wt-%; and
        balance being Fe and unavoidable impurities; and
    wherein a microstructure of the steel product comprises lamellar perlite.

2. The method of claim 1, wherein the composition comprises the tellurium, and wherein the tellurium is in the range of 0.003 to 0.090 wt-%.

3. The method of claim 1, wherein the composition comprises the selenium, and wherein the selenium is in the range of 0.080 to 0.20 wt-%.

4. The method of claim 1, wherein the composition comprises the sulfur, and wherein the sulfur is in the range of 0.065 to 0.090 wt-%.

5. The method of claim 1, wherein the composition comprises the bismuth, and wherein the bismuth is in the range of 0.03 to 0.1 wt-%.

6. The method of claim 1, wherein at the first temperature the steel product is in an austenitic phase, wherein at the second temperature and the third temperature the steel product is in a pearlitic/ferritic phase, and wherein in at the third temperature is greater than the second temperature.

7. The method of claim 1, wherein the first temperature ranges between 1425-1800 degrees F. and wherein the first duration ranges from 15 mins to 5.75 hours, the second temperature ranges between 1000-1300 degrees F. and wherein the second duration ranges from 1 min to 85 mins, and the third temperature ranges between 1100-1400 degrees F. and wherein the third duration ranges from 15 to 130 mins.

8. The method of claim 1, wherein the microstructure comprises at least 75% lamellar perlite.

9. A method for manufacturing an essentially lead free steel, the method comprising:
    subjecting a hot rolled steel product to an annealing heat treatment in which the steel product is subjected to a first temperature for a first duration;

the steel product is subjected to a second temperature for a second duration, wherein the second temperature is less than the first temperature; and the steel product is subjected to a third temperature for a third duration, wherein the third temperature is greater than the second temperature, and wherein an increase from the second temperature to the third temperature occurs over a duration that is greater than or equal to 5 minutes;

cooling the steel product; and wherein the steel product comprises the following composition:
carbon in a range of 0.2 to 0.6 wt-%;
manganese in a range of 0.6 to 1.1 wt-%;
silicon in a range of 0.1 to 0.4 wt-%;
chromium in a range of 0.6 to 1.2 wt-%;
molybdenum in a range of 0.1 to 0.3 wt-%;
sulfur in the range of 0.065 to 0.090 wt-%; and
balance being Fe and unavoidable impurities.

10. The method of claim 9, wherein at the first temperature the steel product is in an austenitic phase, wherein at the second temperature and the third temperature the steel product is in a pearlitic/ferritic phase, and wherein in at the third temperature is greater than the second temperature.

11. The method of claim 9, wherein the first temperature ranges between 1425-1800 degrees F. and wherein the first duration ranges from 15 mins to 5.75 hours, the second temperature ranges between 1000-1300 degrees F. and wherein the second duration ranges from 1 min to 85 mins, and the third temperature ranges between 1100-1400 degrees F. and wherein the third duration ranges from 15 to 130 mins.

12. The method of claim 9, wherein a microstructure of the steel product comprises lamellar perlite.

13. A method for manufacturing an essentially lead free steel, the method comprising:

subjecting a hot rolled steel product to an annealing heat treatment in which the steel product is subjected to a first temperature for a first duration, wherein the first temperature ranges between 1425-1800 degrees F. and wherein the first duration ranges from 15 mins to 5.75 hours;

the steel product is subjected to a second temperature for a second duration, wherein the second temperature is less than the first temperature, the second temperature ranges between 1000-1300 degrees F. and wherein the second duration ranges from 1 min to 85 mins; and the steel product is subjected to a third temperature for a third duration, wherein the third temperature is greater than the second temperature, wherein an increase from the second temperature to the third temperature occurs over a duration that is greater than or equal to 5 minutes, wherein the third temperature ranges between 1100-1400 degrees F., and wherein the third duration ranges from 15 to 130 mins;

cooling the steel product; and wherein the steel product comprises the following composition:
carbon in a range of 0.2 to 0.6 wt-%;
manganese in a range of 0.6 to 1.1 wt-%;
silicon in a range of 0.1 to 0.4 wt-%;
chromium in a range of 0.6 to 1.2 wt-%;
molybdenum in a range of 0.1 to 0.3 wt-%;
at least one or more of:
tellurium in a range of 0.001 to 0.12 wt-%;
selenium in a range of 0.05 to 0.25 wt-%;
sulfur in a range of 0.04 to 0.12 wt-%; or
bismuth in a range of 0.01 to 0.15 wt-%; and
balance being Fe and unavoidable impurities.

14. The method of claim 13, wherein the composition comprises the tellurium, and wherein the tellurium is in the range of 0.003 to 0.090 wt-%.

15. The method of claim 13, wherein the composition comprises the selenium, and wherein the selenium is in the range of 0.080 to 0.20 wt-%.

16. The method of claim 13, wherein the composition comprises the sulfur, and wherein the sulfur is in the range of 0.065 to 0.090 wt-%.

17. The method of claim 13, wherein the composition comprises the bismuth, and wherein the bismuth is in the range of 0.03 to 0.1 wt-%.

18. The method of claim 13, wherein at the first temperature the steel product is in an austenitic phase, wherein at the second temperature and the third temperature the steel product is in a pearlitic/ferritic phase, and wherein in at the third temperature is greater than the second temperature.

19. The method of claim 13, wherein the first temperature ranges between 1550-1690 degrees F. and wherein the first duration ranges from 20 mins to 310 mins, the second temperature ranges between 1100-1200 degrees F. and wherein the second duration ranges from 1 min to 80 mins, and the third temperature ranges between 1200-1300 degrees F. and wherein the third duration ranges from 20 mins to 115 mins.

20. The method of claim 19, wherein a decrease from the first temperature to the second temperature occurs over a temperature decrease duration of 1.5 to 2.5 hrs, and the increase from the second temperature to the third temperature occurs over the duration of 5 to 20 mins.

21. The method of claim 13, wherein a microstructure of the steel product comprises lamellar perlite.

* * * * *